April 15, 1930.                P. STOYA                 1,754,867
                             SLIDING CATCH
                          Filed Jan. 12, 1928

Inventor
P. Stoya
By [signature] Atty.

Patented Apr. 15, 1930

1,754,867

UNITED STATES PATENT OFFICE

PAUL STOYA, OF KLOSTER WENNIGSEN AM DEISTER, GERMANY

SLIDING CATCH

Application filed January 12, 1928, Serial No. 246,298, and in Germany January 12, 1927.

This invention relates to improvements in animal traps.

The object of the invention is to provide a trap wherein the trigger and trigger holding or setting means are so constructed that under all conditions they are correlated for convenient setting of the trigger.

The invention also comprehends improvements in the construction and arrangement of parts which will be hereinafter described and particularly pointed out in the claim.

$a$ represents a base, provided with two bearings in which is mounted the horizontal bar $b$ of a frame $c$. Mounted on the bar $b$ is a coiled spring $d$, one terminal of which bears on the upper surface of the base, while the opposite terminal lies under one of the side bars of frame $c$, to normally rock the frame forward to catch an animal, as will presently appear.

Pivotally mounted on the base is a trigger $e$, the rear end of which is extended upwardly at $o$ adjacent the pivotal connection with the base, the extended portion having a vertical slot $n$. The forward portion of the trigger has a depression $f$, and a pointed projection to accommodate bait, and between the trigger and the base is a spring $g$.

Pivoted in a notch in the rear end of the base is a latch lever $m$, the forward end of which extends through the slot $n$ in the trigger and is stepped to form a finger $i$, and a flange $k$. The rear end portion of the latch lever is formed with a cam slot to receive and hold the front bar of the frame $c$ when the trap is set.

Figure 1:
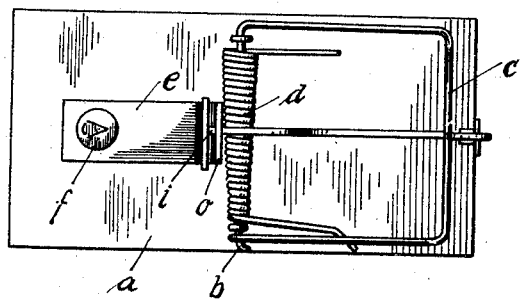
Figure 1 is a plan view of the improved trap.
Figure 2:
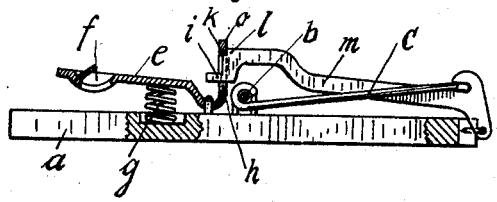
Figure 2 is a side elevation partly in section.

In operation, when it is desired to set the trap, the frame $c$ is swung back until its front bar contacts with the latch lever $m$ at or about the entrance of the cam slot, and upon continued pressure of the frame on the bar, the latter is depressed and the cross bar of the frame rides into the cam slot, as shown in Figure 1. In depressing the lever $m$, the spring $g$ tends to force the vertical end portion $o$ of the trigger toward the face of said lever, and the top wall of the slot $n$ engages the flange $k$ and thus sets the parts in operative possition.

When an animal feeds on bait placed on the trigger, the latter is tilted, hence the vertical end portion $o$ moves away from the flange $k$, and the front cross bar of the spring actuated frame $c$ engaging the upper wall of the cam slot in the latch lever, rocks the latter on its pivot and thus permits the bar to move out of the cam slot and swing forwardly toward the base and impinge the feeding animal.

When the trap is not in set position, the finger on the latch lever rides up in the slot $n$, and the upper end of the vertical portion of the trigger is forced up against the end face of the latch lever by spring $g$, with the result that trigger and the latch lever are at all times in correlated position to properly function.

What I claim is:

An animal trap comprising a base, a trigger pivotally mounted on the base, said trigger having its rear end extended vertically and provided with a slot, a coil spring seated in a recess in the base directly below the trigger, said spring tending to rock the trigger on its pivot, a latch lever pivotally mounted at one end of the base and provided on its upper edge with a cam slot, a finger formed on the forward end of the latch and engaging the slot of the trigger, said forward edge of the lever being formed with a narrow flange and a shoulder, said flange adapted to engage the upper wall of the slot when the trap is in set position, said shoulder engaging the vertical wall of the trigger and acting as a stop against the action of the spring, a spring-actuated frame pivoted to the base, the cross bar of the frame engaging the cam slot of the latch lever when said trap is in set position, whereby rocking movement of said trigger will release the flange of the lever and allow the cross bar to ride out of the cam slot and swing through its arc.

In testimony whereof I affix my signature.

PAUL STOYA.